United States Patent

Diehl et al.

[15] 3,642,266
[45] Feb. 15, 1972

[54] BURNER FOR OXYACETYLENE WELDING AND/OR CUTTING

[72] Inventors: Edmund Diehl, Frankfurt am Main; Traugott Gutermann, Ober-Roden, Waldacker, both of Germany

[73] Assignee: Messer Griesheim GmbH, Frankfurt am Main, Germany

[22] Filed: Feb. 19, 1970

[21] Appl. No.: 12,668

[30] Foreign Application Priority Data

Feb. 27, 1969 Germany.....................P 19 09 808.9

[52] U.S. Cl..............................266/23 P, 239/413, 239/530, 239/581
[51] Int. Cl.......................................................B23k 7/00
[58] Field of Search................266/23 R, 23 P; 239/413, 530, 239/581

[56] References Cited

UNITED STATES PATENTS

| | | | |
|---|---|---|---|
| 1,404,011 | 1/1922 | Coberly | 266/23 P |
| 1,453,385 | 5/1923 | Dzutsoff | 266/23 P |
| Re 16,307 | 3/1926 | McCutcheon | 239/530 |
| 1,879,631 | 9/1932 | Mott et al. | 239/413 |
| 2,286,192 | 6/1942 | Aitchison et al. | 266/23 P |
| 3,111,980 | 11/1963 | Spies | 239/581 |

*Primary Examiner*—Gerald A. Dost
*Attorney*—Ernest F. Marmorek

[57] ABSTRACT

The gas welding and cutting torch comprises an elongated handle having a handle body. The handle body contains axially directed bores which are coupled to a gas supply by means of replaceable conduit pieces. The outlet end of each conduit piece that projects into the bore is shaped into a valve seat and is controlled by a conical sealing disc. The sealing disc is seated in a cage which is integral with a guiding member of a movable valve stem. The valve stem is arranged for axial movement within the bore; the guiding member of the valve stem has a threaded peripheral portion which is in engagement with a coaxially arranged hand control ring. The hand control ring is disposed in a recess intersecting the bore, and drives the valve stem and thus the sealing disc back and forth against the valve seat. The valve stem is provided with a central longitudinal passage for passing through the gas from the valve seat to a replaceable welding nozzle. The guiding member of the valve stem is sealed at each side of the recess and is spring loaded to avoid the backlash in the driving thread.

4 Claims, 2 Drawing Figures

INVENTORS
Edmund Diehl and
Traugott Gutermann,
BY
Their Attorney.

3,642,266

BURNER FOR OXYACETYLENE WELDING AND/OR CUTTING

This invention relates generally to gas welding and/or gas cutting. More particularly, this invention relates to an autogenous torch of the type which has a handle with control valves for a fuel gas and oxygen, and for supporting a replaceable welding nozzle.

Prior art welding torches have a handle which is provided with laterally projecting stems and handwheels of the gas control valves. The disadvantage of such known arrangement resides in that at restricted welding conditions such as, for example, among a plurality of closely side-by-side arranged pipes, the welding manipulation is extremely difficult, if not impossible. For this reason, it is frequently necessary in practice, to disconnect the welding torch from the gas-supplying hoses in order that the latter might be reinstalled separately, from different sides of the structure to be welded.

SUMMARY OF THE INVENTION

One of the objects of this invention is, therefor, to provide a welding torch which is designed without any laterally protruding control parts.

Another object of this invention is to provide a handle for the welding torch, which is reduced in size, especially in its effective diameter.

Still another object of this invention is to provide a welding torch which can be manufactured and assembled with minimum costs.

According to this invention, the above objects are attained, in a welding torch having a disconnectable nozzle insert and a handle with gas supply conduits, by arranging the stems for the gas control valves within the body of the handle and by directing these stems substantially in parallel with the longitudinal axis of the handle body.

By this novel arrangement it is now possible to locate the hand control rings for respective stems in such a manner as to only negligibly exceed the surface of the handle body. As a consequence, the gas welding torch of this invention can be reduced in diameter and easily manipulated even in restricted working spaces, or at very difficult positions. The danger that the quality of resulting welding seams will be impaired due to unfavorable conditions for the manipulation with the torch is thereby considerably eliminated.

In a further development of this invention, it has been suggested that both the valve stems and the control members thereof be located within the handle of the torch. In this way it is insured that no valve spindles or stems with associated hand controls will increase the effective diameter of the torch. Consequently, there will occur no bendings of the valve stems or damages of the hand control members due to rough working conditions. The maximum transverse sectional dimension of the torch handle can be substantially reduced in comparison with prior art welding torches of this type.

In a preferred modification of this invention, which is particularly advantageous with regard to the production, the axes of the valve stems and the axes of the correlated gas conduits are in alignment with each other. At the same time, the axes of respective conduits are preferably arranged parallel to the axis of the torch handle.

In a further development of this invention, the handle body is provided with longitudinal bores communicating with respective gas conduits, the edge of the conduit opening in this bore being adapted as a valve seat; an elongated stem body is movably disposed within the bore and supports at the end thereof opposite to the valve seat a valve sealing member. The stem body is moved preferably against a tension spring which abuts against the edge of the conduit opening. Since only one bore is required for the coupled valve and conduit, the production process can be thus very simple, and complicated structures of valves in the housing of the torch handle are thereby completely eliminated. Similarly, both the assembly and the replacement of respective structural elements are greatly facilitated. The application of the tension spring is especially advantageous in case of threaded stems, since at any phase of the displacement of the valve stem the thread backlash of the engaging hand control knob is thereby compensated and, as a result, an arbitrarily fine adjustment can be attained.

The longitudinal arrangement of the valve stems according to this invention renders the possibility to modify the torch handle configuration according to the novel arrangement of the hand control knobs or rings. For example, it is possible to place each hand control knob or ring into a recess in the body of the handle and rotate these control members around the axis of the valve stem. To avoid friction between the metal side surfaces of each control ring and the housing of the handle, slide rings are provided on these side surfaces. In addition, to seal the movable valve stems with regard to the gas conduit in the body of the handle, resilient seal rings are suggested to be placed between the peripheral portions of the valve stem and the wall of the bore in the handle body.

In a particularly advantageous modification of the valve stem, the latter is composed of two parts, namely of a guiding body and of a cage which supports the valve seal member. Moreover, a central passage is provided in the guiding body of the valve stem. This passage communicates via oblique channels at one end in the guiding body and via the bore portion around the aforementioned cage, with the valve seat in the gas supply conduit. The opposite end of the passage is connected through discharge means with the welding nozzle connector. This structure has the advantage that the path of the gas flow is directed on the shortest line through the valve stem portion. Consequently, the traverse dimension of the torch handle can be reduced.

According to another feature of this invention, the valve seal member is made in the form of a bolt which, with a certain clearance, is seated in the cage coaxially with the longitudinal axis of the entire valve stem. The sealing end of the bolt is provided with a frustoconical valve disk, whereas the opposite end thereof in the cage has spherical configuration. As a result, certain deviations in the position of the valve-sealing member with regard to the position of the valve seat can be tolerated since these minor mounting inaccuracies which always may occur, are by this means automatically compensated and the sealing effect is always insured.

According to still another feature of this invention, the conduit piece which comprises the valve seat is removably connected to the central bore in the handle body and it is secured therein by means of a locking ring. Such a removable arrangement of the conduit piece enables that a leaky valve seat can be readily replaced. The torch handle can, therefore, be arbitrarily increased in length, since no refinishing operations in the valve seats are necessary after the assembly of the torch handle.

BRIEF DESCRIPTION OF SEVERAL VIEWS OF THE DRAWING

In order that the invention may be clearly understood and readily carried into effect, it will now be described more fully with reference to the accompanying drawing, in which.

DETAILED DESCRIPTION

Figure 1:
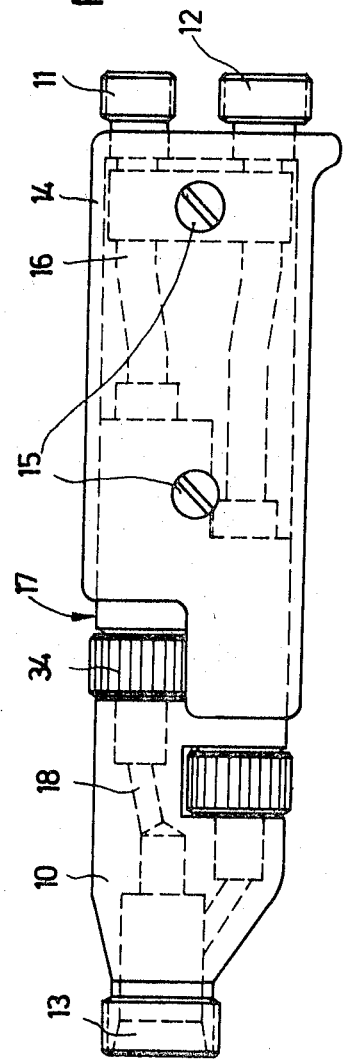
FIG. 1 is a schematic side-elevational view of the welding torch handle according to this invention.

FIG. 1 illustrates a torch handle 17 having a handle body 10. At the right hand end of the handle body 10 there are provided couplings 11 and 12 for the gas supply conduits. At the left-hand end of the handle body 10, a screw coupling 13 for the attachment of a torch nozzle insert, is operatively arranged. For the reason of simplification, this nozzle insert itself is not shown in the drawing.

The coupling 12 serves for the connection of a hose for the fuel gas supply, and the coupling 11 connects the hose for oxygen. The gas conduit pieces 16 that extend from the rear end of the handle body 10, are covered by a tubular holding envelope 14. The holding envelope 14 is secured to the handle body 10 by screws 15.

Figure 2:
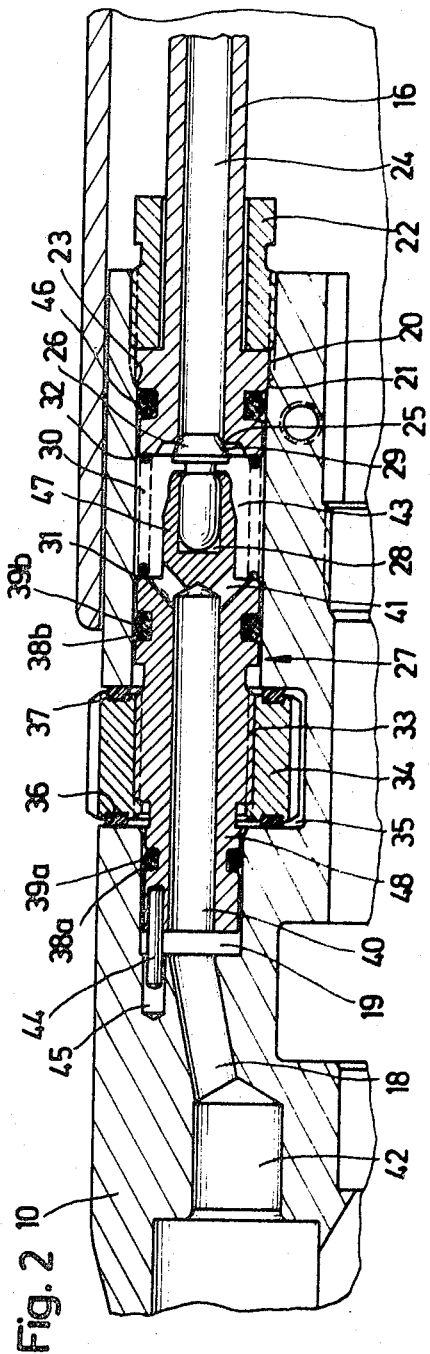
FIG. 2 is a fragmentary sectional view of the upper portion of the torch handle as shown in FIG. 1.

With reference to FIG. 2, one gas is fed to the torch nozzle through the conduit piece 16, a valve unit 27 and an outlet channel 18. In FIG. 2 there is shown in detail the structural arrangement of the control valve unit in a single gas-feeding channel, namely in the oxygen channel, only. The arrangement of the fuel-gas-feeding channel corresponds substantially to that as shown in FIG. 2 and to avoid the unnecessary duplication in the drawing, it is not illustrated therein.

The torch handle body 10 contains longitudinal bores 19 extending from the right-hand side in the direction parallel to the axis of the torch handle body 10. A connecting conduit piece 16 from the coupling 11 is connected to the inlet opening of the bore 19. To hold the conduit piece 16 in a fixed position within the bore 19, the connecting end of the bore 19 is slightly increased in diameter to produce a conical step 21. The increased end portion of the bore 19 is provided with a thread 20. The corresponding connecting end of the conduit 16 is provided with a shoulder 23 which is adjusted to the increased clearance of the end portion of the bore 19 and abuts against the step 21. In addition, the leading portion of the shoulder 23 is matched in diameter to the clearance of the rest of the bore 19, and is provided on its periphery with a sealing ring 46 which insures the seal against the wall of the bore 19. A threaded locking ring 22 is screwed into the thread 20 at the inlet of the bore 19, to force the slightly projecting tail portion of the shoulder 23 against the step 21, thereby locking the conduit piece 16 in its fixed position. The outlet end of the passage 24 in the conduit piece 16 is controlled by the valve unit 17. The edge of the wall of the conduit piece 16 is adjusted to form the seat 25 for the cooperation with a valve bolt 26. The valve bolt 26 is seated in a cage 47 which projects from the guiding body portion of the valve stem 48. The end 28 of the valve bolt 26 that is enclosed within the cage 47 has preferably a spherical shape, whereas the protruding sealing end of the valve bolt is in the form of a frustoconical sealing disk 29. Since the valve bolt 26 has a certain lateral clearance with respect to the inside walls of the cage 47, the sealing action of the frustoconical sealing disk is insured even if increased tolerances take place during the assembly of the torch head 17.

A tension spring 30 is disposed between the end of the shoulder 23 of the locked conduit piece 16 and the opposite end portion of the guiding body of the valve stem 48. A traverse recess 35 in the handle body 10 intersects a portion of the bore 19. A wall portion of the guiding body of the valve stem 48 that is situated in the area of the recess 35 is provided with a thread 33. A coaxially arranged hand control ring 34 is disposed for rotation in the recess 35 and engages with the thread 33 of the valve stem 48. The hand control ring 34 is dimensioned in such a manner as to project above the surface of the handle body 10 only within the range of the wall thickness of the tubular holding envelope 14.

To insure a rectilinear movement of the valve stem 48 or, in other words, to prevent an angular displacement thereof during the rotation of the hand control ring 34, the valve stem 48 must be equipped with a guiding pin 44 which is firmly secured in the guiding body of the valve stem 48. This guiding pin 44 is in turn guided in an axially directed bore 45 in the handle body 10 at the end of the bore 19.

According to the sense of rotation of the hand control ring 34, the valve stem 48 can be thus displaced as far to the right as to seal by means of the valve bolt 26 the valve seat 25, or it can be removed to the left side to open this valve seat. To prevent a metal on metal friction between the hand control ring 34 and the opposite walls of the recess 35, the sidewalls of the hand control ring 34 are provided with annular grooves 36 which support slide rings 37. The slide rings 37 are preferably made of a wear resistant material such as, for example, of the commercially available plastic known under the trade name Hostaflon.

The guiding portion of the valve stem 48 according to this invention is further provided with an axial passage 40 which, at the outlet end thereof, communicates via the outlet end portion of the longitudinal bore 19 and via a channel 18 with a mixing chamber 42; the inlet end of the passage 40 is connected through oblique channels 41 with that portion of the bore 19 which surrounds the cage 47 (space portion 43). In order to seal the outlet end portion of the bore 19 and the space portion 43 from the recess 35, annular grooves 38a and 38b are created in the outer wall of the guiding portion of the valve stem 48 at each side of the recess 35, and provided with sealing rings 39a and 39b which hermetically seal the resulting airgap.

The tension spring 30 which is positioned in the space portion 43 to load axially the valve stem 48, compensates the backlash in the thread 33 at any position of the hand control ring 34. As a result, a fine adjustment of the position of the valve 17 is secured.

We wish it to be understood that we do not desire to be limited to the exact details of construction shown and described, for obvious modifications will occur to a person skilled in the art.

Having thus described the invention, what we claim as new and desire to be secured by Letters Patent, is as follows.

1. A torch for gas welding and cutting, comprising in combination,
   a torch handle having a handle body;
   gas supply coupling means disposed at one end of said torch handle for being connected to a gas supply;
   torch nozzle-coupling means provided at the opposite end of said torch handle for receiving a blowpipe head;
   gas conduit means extending within said torch handle substantially in parallel with the longitudinal axis of said torch handle to connect said gas supply coupling means with said torch nozzle-coupling means;
   valve means having a movable valve stem member for controlling the gas flow in said conduit means;
   said movable valve stem member being disposed within said torch handle for being moved substantially in parallel with the longitudinal axis of said torch handle;
   hand control means operatively coupled with said movable stem member to control the axial displacement of said valve means, said hand control means being arranged substantially within the spatial area of said torch handle,
   said torch handle being provided with longitudinal bores extending in axial direction with said handle body and with conduit pieces connecting said bores with said gas supply coupling means;
   said valve stem member being operatively arranged for axial movement in each bore;
   the inlet portions of said bores being coupled with outlet portions of said conduit pieces, respectively;
   said valve stem members being provided with valve-sealing means adapted for the sealing of said outlet portions of said conduit pieces,
   said handle body being provided with recesses for receiving said hand control means, said recesses being as deep as to intersect said axial bores, respectively;
   said hand control means being in operative engagement with said movable valve stem member in the resulting area of intersection of said bores with said recesses,
   wherein said hand control means is a control ring arranged coaxially on said valve stem member, the contact surfaces of said control ring and of said valve stem member being threaded.

2. A torch according to claim 1 wherein the end portion of said valve stem member opposite to said valve seat is reduced in diameter and provided with an axial boring to form a cage portion for receiving said valve sealing means; the remaining guiding portion of said valve stem member having a central passage extending in longitudinal direction therethrough, said passage communicating at the cage end of said valve stem member through a bore portion around said cage with said valve seat and, at the end portion of said bore, said passage communicating with said nozzle-coupling means to pass the gas flow therethrough.

3. A torch according to claim 2 wherein said valve sealing means is in the form of a bolt which is seated with certain clearance within the boring of said cage; the projecting end of said bolt opposite to said valve seat being provided with a matching conical surface whereas the other end thereof within said cage has a spherical configuration to allow certain lateral tolerance of movement of said bolt within said cage.

4. A torch according to claim 2 wherein said guiding portion of said valve stem means is provided with sealing rings at each side of said area of intersection of said bore with said recess.

* * * * *